L. D. SMITH.
ELECTRIC COOKING APPARATUS.
APPLICATION FILED FEB. 12, 1912. RENEWED JAN. 8, 1913.
1,068,706.
Patented July 29, 1913.
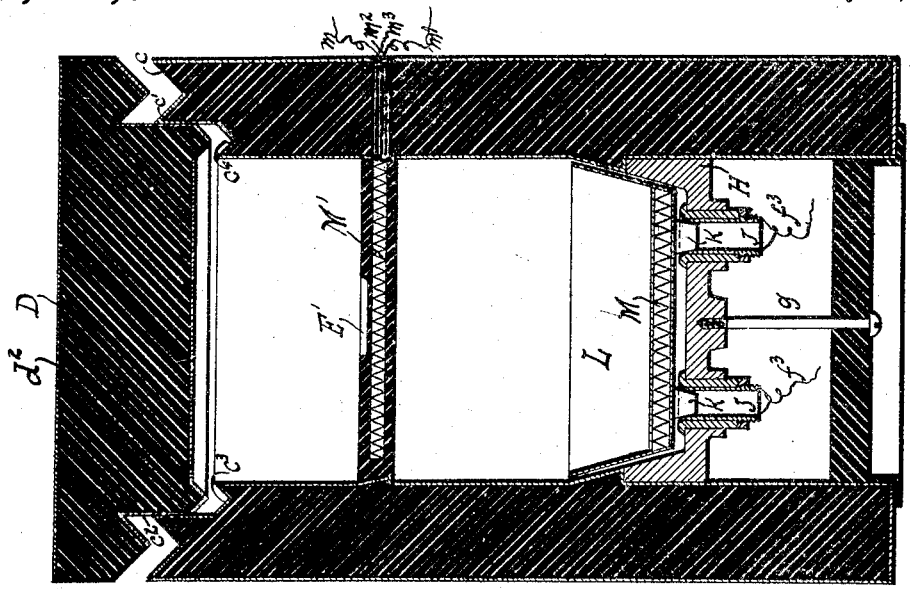
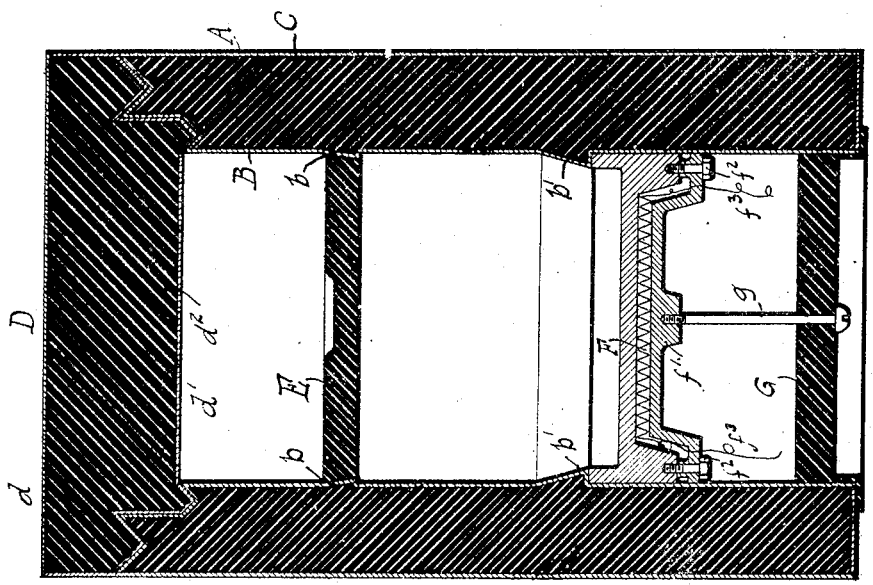
WITNESSES:
Paul A. R. Kroesing, Jr.
Lotta Lee Bray.
INVENTOR
Luther D. Smith
BY
Ralgemond A. Parker
ATTORNEY

UNITED STATES PATENT OFFICE.

LUTHER D. SMITH, OF DETROIT, MICHIGAN.

ELECTRIC COOKING APPARATUS.

1,068,706.  Specification of Letters Patent.  Patented July 29, 1913.

Application filed February 12, 1912, Serial No. 677,262. Renewed January 8, 1913. Serial No. 740,898.

*To all whom it may concern:*

Be it known that I, LUTHER D. SMITH, a citizen of the United States, residing at Detroit, county of Wayne, State of Michigan, have invented a certain new and useful Improvement in Electric Cooking Apparatus, and declare the following to be a full, clear, and exact description of the same, such as will enable others skilled in the art to which it pertains to make and use the same, reference being had to the accompanying drawings, which form a part of this specification.

My invention relates to electric cooking apparatus, and consists in the various arrangements and combinations hereinafter pointed out and specified in the claims.

In the drawings:—Figure 1, is a sectional elevation of my improved cooker. Fig. 2, is a sectional elevation of a modification thereof.

In the drawings, similar letters refer to similar parts.

In the drawings, A is the outside wall of the cooker; B, is the inside wall, the space C between the two being filled with a heat insulating material. D, is the cover which is also made of double walls $d$, $d'$ and filled with insulating material $d^2$ in like manner to the side walls. It will be noted that the cover D fits upon the top of the walls A B C with an irregular fitting surface, as shown in Figs. 1 and 2, the cover in Fig. 2 being lifted partially from the side walls in order to show the relative shape of the parts as distinguished from each other.

The top of the casing A B C is formed of metal, shaped in an angular manner with a depending angle $c$, a vertical acute angle $c'$, a substantially vertical wall $c^2$ and another depending angle $c^3$ then again rising to an acute angle $c^4$ to the edge of the inner wall B. There is thus formed two grooves in the top of the side walls, to wit, $c$ and $c^3$, the object of these grooves is to catch and retain the condensed steam that may form inside of the cooker and be condensed in passing outward through the crevices formed between the cover and the side wall, said condensed steam in the form of water entering in the grooves $c$ and $c^3$ so as to form a water seal.

The inner wall B is expanded internally at $b$ so as to form an angular shaped expansion into the interior of the heater.

A supplementary radiator E formed of heat retaining material, such as cast iron, for instance, may be inserted and held by the restricted portion of the internal part of the cooker, after heating the same for a purpose hereinafter described. Or the radiator E may be formed up with a heating coil which may be connected up with a source of electricity through insulated porcelain or blocks in the side-walls, as shown at E' in Fig. 2.

The radiator E' is a modified form of the radiator E but is held in a similar manner and may contain an electric coil M' with electrical connections leading therefrom $m$, $m'$, through insulated parts $m^2$, $m^3$ of the side wall, as shown in Fig. 2. A similar constriction is formed in the inner walls at about one-third of the height and is marked $b'$, the wall is then restored to its original diameter and continued to the bottom of the heater.

In the form shown in Fig. 1, a permanent radiator is located in the cooker, its outer walls closely fitting the inside wall of the cooker. It will be noted that this radiator is inserted about one-fourth of the way from the bottom to the top of the cooker and is not at the bottom of the cooker as the practice has heretofore been. The bottom of the cooker walls A B is closed by an insulating bottom or cover G of heat insulating material which may be supported therein in any convenient manner from the radiator F (which is held firmly in position). The manner of supporting it may be screws or any other means whereby said bottom may be detached. The lower cover G provides an accessible means of removing the plate $f'$ of the radiator for the purpose of repair or inserting a new electric coil; the plate $f'$ being removable by detaching screws $f^2$, $f^2$, or it may be held rigidly by any other means. The upper plate of the radiator is designed to be rigidly attached to the inner walls and separates the hollow column of the heater into two sections, the removal of the cover D disclosing the contents of the upper section while the removal of the cover G discloses the electrical connections of the lower section. A bolt $g$ is inserted through the cover G and supports the lower cover in position, as shown in Figs. 1 and 2. The heating coil of the radiator is supported between two members of suitable insulating material held by screws $f^2$, $f^2$, which are removable by displacing the cover G after removing the screw $g$. Appropriate leads $f^3$, $f^3$, can be taken from the heating coil and carried to any convenient switch either on the stove or upon any other section with such connections as are usually made in electrical apparatus.

The angular ledge $b'$, $b'$, is adapted to support any properly shaped dish that may be placed therein in such manner that the bottom is held on the radiator F. Many times such dishes are shallower than the depth of the heater and therefore I have employed the supplementary radiator which can be preliminarily heated in a convenient manner and after the dish is inserted, it can also be inserted above the dish and thus the heat may be equalized during the cooking operation. Furthermore, another dish can be placed on top of the supplementary radiator E and the cooking going on in both together simultaneously. In Fig. 2, I have shown a modification of this structure in that the radiator F is replaced by a diaphragm H which is held in position in the same manner as the upper plate of the radiator in Fig. 1, but instead of carrying a heating coil, it carries hollow terminals J, J, which are also connected by wires $f^3$, $f^3$, to any source of electrical supply and connects therewith through switches in the same manner as hereinbefore stated and as usual in the art. These terminals J, J, are shaped at their upper ends to receive metal plugs K, K, which are formed upon the bottom of a dish L, the bottom of the dish, however being double and containing in the appropriate manner an electric heating coil M, the terminals of this coil are connected respectively to the terminals K, K, and therefore when the dish L is in position in the heater, as shown in Fig. 2, electrical connection is made so that the heating coil is rendered operative on the turning of the switch and the contents of the dish L are heated as well as the interior of the cooker. I have also hitherto shown in this figure (2) a supplementary radiator E' containing heating coil M' as hereinbefore described. In all other respects, the structure of the cooker remains the same as that shown in Fig. 1 and therefore need not be described.

It will be seen that essentially my heating structure consists of a perpendicular column surrounded by a non-heat conducting material and provided with a diaphragm rigidly supported intermediate between the two ends, and designed to carry electric heating coils forming two separate cylindrical chambers; the upper chamber designed to contain cooking foods and provided with an insulated heat retaining cover of peculiar shape. The lower chamber designed to contain removable electrical resistance material with connecting attachments and also provided with a suitable removable cover to admit convenient access thereto.

Heretofore the practice has been to place the electrically heated disk within the upper compartment where expansion and contraction caused by continued service rendered it liable to "short circuits" and short lived. The means which I have adopted provides against this as well as for convenient and economical construction and arrangement of parts used in combination with it to secure low consumption of electric current for all kinds of cooking purposes.

What I claim is:—

1. In an electric cooking stove, the combination of heat insulating side walls open at the top and bottom, a removable heat insulating cover for the top, a removable heat insulating cover for the bottom and a permanent radiator supported between the two covers within the side walls and comprising a removable lower portion and a fixed upper portion between which lies a heating coil, substantially as described.

2. In an electric heating stove, the combination of side walls open at the ends, of removable insulating covers at both the top and bottom and a permanent heating element supported near the bottom of the space inclosed by the side walls and means for hanging the bottom removable cover to said permanent heating element, the said permanent heating element dividing the chamber inclosed by the side walls into an upper heating compartment and a lower compartment through which access to the heating devices may be had, substantially as described.

3. In an electric cooker, the combination of walls forming an inclosure, electrical connections leading thereinto, a member dividing the inclosure into a cooking compartment and a compartment for the said electrical connections, the said electrical connections leading into the said member and closures for openings into each of said compartments, whereby access can be had to either compartment and its contents, substantially as described.

4. In an electric cooker, the combination of walls forming an inclosure, electrical connections leading thereinto, a two-part member dividing the inclosure into a cooking compartment and a compartment for containing the electrical connections and a heating coil contained between the two parts of the two-part member, a part of said member on the side of the electrical compartment being removably connectible with the other part to give access to the coil and closures for openings in each of said compartments, substantially as described.

In testimony whereof, I sign this specification in the presence of two witnesses.

LUTHER D. SMITH.

Witnesses:
LOTTA LEE BRAY,
R. A. PARKER.